UNITED STATES PATENT OFFICE.

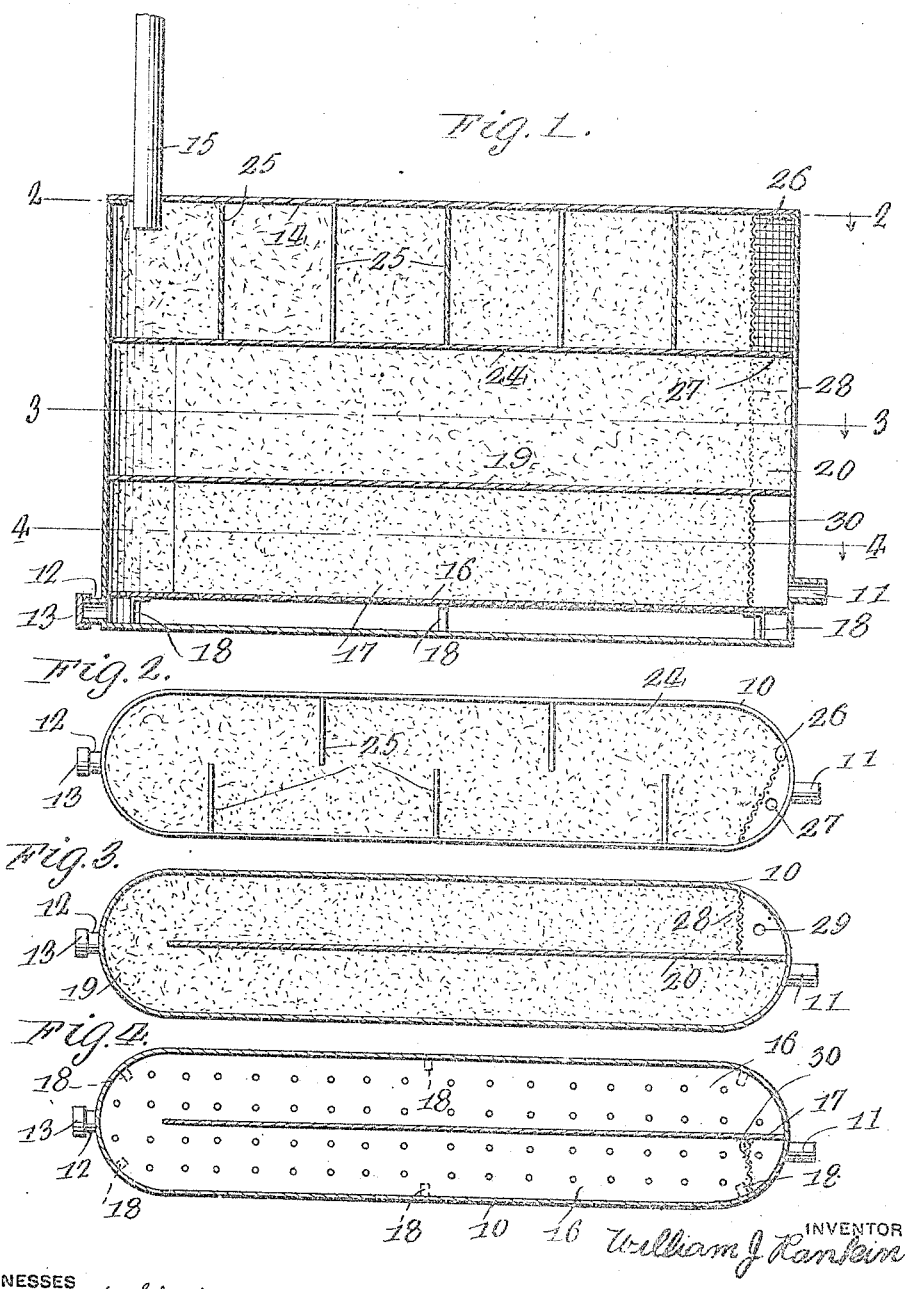

WILLIAM J. RANKIN, OF TULSA, OKLAHOMA.

FILTER.

1,186,608.  Specification of Letters Patent.  Patented June 13, 1916.

Application filed December 3, 1915. Serial No. 64,867.

*To all whom it may concern:*

Be it known that I, WILLIAM J. RANKIN, a citizen of the United States, residing at Tulsa, in the county of Tulsa and State of Oklahoma, have invented certain new and useful Improvements in Filters, of which the following is a specification.

This invention relates to an improved filter and the principal object of the invention is to provide a filter having a body portion provided with partitions directing the course of the water through the filter and to further provide improved means for preventing the filtering material from being washed out of the filter and to further provide the filter with a chamber for receiving sediment, the sediment receiving chamber being provided with an outlet so that the filter can be easily washed.

Another object of the invention is to so construct this filter that when desired the supporting plates or partitions can be removed thus permitting new filtering material to be put in place when necessary.

Another object of the invention is to provide a filter which will be very compact and thus take up a small amount of space while at the same time causing the water to move slowly while passing through the filter and thus be thoroughly cleaned.

This invention is illustrated in the accompanying drawings, wherein:—

Figure 1 is a vertical longitudinal sectional view through the improved filter. Fig. 2 is a view taken along the line 2—2 of Fig. 1. Fig. 3 is a longitudinal transverse sectional view taken along the line 3—3 of Fig. 1. Fig. 4 is a sectional view taken along the line 4—4 of Fig. 1.

The casing or body portion 10 of this filter is provided with an outlet spout or pipe 11 adjacent the bottom and positioned at one end of the casing and with a drain pipe 12 which is positioned at the opposite end of the casing and provided with a cap 13 for normally closing the drain pipe. This casing is provided with a cover 14 which fits upon the casing as shown in Fig. 1 and may be secured by any suitable means. The inlet pipe 15 passes through an opening formed in the cover 14 so that water may pass into the filter and after passing through the filter pass out through the outlet pipe or neck 11.

In the bottom of the casing or body portion 10 there is positioned a perforated grate or plate 16 which is constructed as shown in Fig. 4 and carries the longitudinally extending partition 17. This grate is supported by means of the legs 18 so that it will be held in spaced relation to the bottom of the casing thus providing a space in which the material filtered from the water can gather. Above the plate 17 there is positioned the partition 19 upon which rests the plate 20 similarly to the plate 17. These plates 17 and 20 guide the passage of the water through the two lower chambers thus causing the water to travel the length of the casing and back again before passing out of each chamber. In the upper portion of the casing 10 there is provided a partition 24 which rests upon the plate 20 and between partition 24 and the cover 14 there is provided the baffle plates 25 extending transversely of the chamber formed in the upper portion of the casing.

When this filter is in use it is positioned with the inlet pipe 15 extending into the upper chamber. It is of course, understood that the three chambers will be filled with any suitable filtering material so that as the water passes through the filter it will be cleaned. As the water passes through the upper chamber it passes around the baffle plates 25 and then passes through the screen 26 to reach opening 27 formed in the partition 24. This screen is provided so that the filtering material will be prevented from filling the opening 27 or passing through the opening with the water. The water will then pass through the second chamber of the filter around plate 20 and after passing through the screen 28 will pass through opening 29 into the lower chamber. The water will then pass around the plate 17 and out through the outlet pipe 11. A screen 30 is provided so that the filtering material will be prevented from passing out through the pipe 11. The foreign matter in the water such as mud will collect in the filtering material and will gradually work down into the space beneath the grate 16. When it is necessary to clean this filter the cap 13 can be removed and water permitted to flow through the drain 12 thus carrying the mud and other foreign matter out of the filter. If desired hot water can be poured through the filter, thus thoroughly cleansing and sterilizing the filtering material and filter. When it is necessary to replace the filtering material the cover 14 can be removed and the partitions and baffle plates withdrawn from the casing and then put in place and at the same time the filtering material replaced with new material.

What is claimed is:—

1. A filter comprising a casing provided with a plurality of outlets, means for normally closing one of the outlets, longitudinally extending partitions extending through said casing and dividing the same into an upper chamber, a lower chamber and an intermediate chamber, a cover for said casing provided with an inlet opening, transversely extending baffle plates positioned in the upper chamber, the flooring of the upper chamber being provided with an opening communicating with the intermediate chamber, a fabric guard positioned in the upper chamber adjacent the opening formed in the flooring thereof, a longitudinally extending guide plate positioned in the intermediate chamber, the flooring of the intermediate chamber being provided with an opening positioned upon the opposite side of the guide plate from the opening in the flooring of the upper chamber and communicating with the lower chamber, and a guard positioned in the intermediate chamber for the opening formed in the flooring thereof, a longitudinally extending guiding plate positioned in the lower chamber, a grating positioned in the lower chamber in spaced relation to the bottom thereof and positioned above one of the outlets of the casing and below the second outlet, and a guard for the second outlet positioned in the lower chamber.

2. A filter comprising a casing having a plurality of outlets positioned at opposite ends of the casing, longitudinally extending partitions in said casing dividing the same into compartments, a grating in the lower compartment positioned between the outlets, guide plates directing the passage of water through said compartments, the partitions in said casing being provided with openings for permitting communication between the compartments, and perforated guards in the compartments for preventing filtering material placed in the compartments from passing through the openings in the partitions and through one of the outlets of the casing.

3. A filter comprising a casing provided with an outlet and with a drain, partitions in said casing dividing the same into a plurality of compartments, a grating positioned in the lower compartment between the outlet and the drain, the partitions being provided with openings for permitting communication between the compartments, and perforated guards in the compartments for preventing filtering material placed in the compartments from passing through the openings in the partition.

In testimony whereof I affix my signature in presence of two witnesses.

WILLIAM J. RANKIN.

Witnesses:
S. A. MILLER,
S. L. RANKIN.